United States Patent
Brink (10) Patent No.: US 7,134,816 B2
(45) Date of Patent: Nov. 14, 2006

(54) ROTATABLE TOOL FOR CHIP REMOVING MACHINE

(75) Inventor: Magnus Brink, Ockelbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 14 days.

(21) Appl. No.: 11/109,803

(22) Filed: Apr. 20, 2005

(65) Prior Publication Data

US 2005/0232716 A1 Oct. 20, 2005

(30) Foreign Application Priority Data

Apr. 20, 2004 (SE) .................................. 0401010

(51) Int. Cl.
*B23B 51/02* (2006.01)
(52) U.S. Cl. ..................... 408/226; 408/230; 408/232; 408/713
(58) Field of Classification Search ................ 408/144, 408/226, 227, 230, 231, 232, 713
See application file for complete search history.

(56) References Cited

U.S. PATENT DOCUMENTS 5,957,631 A * 9/1999 Hecht .......................... 408/144
6,783,307 B1 * 8/2004 Lindblom .................... 408/226
6,783,308 B1 * 8/2004 Lindblom .................... 408/230
6,899,495 B1 * 5/2005 Hansson et al. ............ 408/144

FOREIGN PATENT DOCUMENTS

| DE | 3230688 A1 * | 2/1984 |
| DE | 20204848 U1 * | 6/2002 |
| WO | WO 2003031104 A1 * | 4/2003 |

* cited by examiner

Primary Examiner—Daniel W. Howell
(74) Attorney, Agent, or Firm—Drinker Biddle & Reath LLP (57) ABSTRACT

A cutting tool for rotary cutting includes a rotatable basic body and a replaceable cutting part or loose top, which is connectable to the basic body via a male/female coupling, which includes a groove and a male part. The groove is formed in a front end of the basic body and is delimited by a bottom surface and two side surfaces. The male part is insertable into the groove along the axis of rotation and protrudes rearwardly from the loose top. The male part has an end surface and two flank surfaces. In the front part of the basic body a forwardly open slot is formed, which separates two elastically deflectable legs wich clamp the male part in the groove. In either the end surface or the bottom surface a recess is formed for receiving a projection on the other surface. The recess is larger than the projection in order to enable the male part to reciprocate a short distance in the groove, whereby the loose top is self-centering with respect to the axis of rotation.

11 Claims, 8 Drawing Sheets

ROTATABLE TOOL FOR CHIP REMOVING MACHINE

The present application claims priority under 35 U.S.C. § 119 to Patent Application Serial No. 0401010-4 filed in Sweden on Apr. 20, 2004.

TECHNICAL FIELD OF THE INVENTION

This invention relates to a rotatable tool intended for chip removing or chip forming machining and being of the type that comprises a basic body, as well as a replaceable cutting part, which is clamped to the basic body via a male/female coupling. The coupling includes, on one hand, a groove formed in a front end of the basic body, which groove is delimited by a bottom surface and two side surfaces, and on the other hand a male part insertable into the groove and protruding rearward from the cutting part. The male part has an end surface and two flank surfaces. In the front part of the basic body a forwardly open slot is formed, which separates two elastically deflectable legs with the purpose of holding the male part clamped in the groove. In one of the end and bottom surfaces, a seating recess is formed for the receipt of a projection disposed on the other of the end and bottom surfaces.

BACKGROUND OF THE INVENTION

Cutting tools of the type that makes use of a basic body, as well as a separate, replaceable cutting part, may in practice comprise drilling tools, milling tools, such as end mills or slitting cutters, thread cutters, etc. Usually, the basic body consists of an elongate shaft of a cylindrical basic shape. In modern machine tools, the basic bodies are so sophisticated and expensive that they, for economical reasons, cannot be integrated with the cutting part, which constitutes the wear part of the tool and has a limited service life. In other words, it is profitable to make the actual cutting part in the form of a separate, releasable unit, which by those skilled in the art usually is denominated "loose top", and which can be exchanged after wear, while the expensive basic body can be used for a longer time (usually 10 to 20 exchanges). In practice, the loose top is manufactured entirely or partly from a hard, wear-resistant material, such as cemented carbide or the like, while the basic body is made from a material having greater elasticity, e.g., steel. It should also be pointed out that tools of the kind in question primarily—though not necessarily—are intended for the machining of workpieces of metal.

The development of loose top tools is particularly intense and interesting in the field of drilling. For drilling purposes, either simple drilling machines or multioperation machines are used, which in both cases include a strong and rigidly mounted machine spindle or holder, in which a rear end of the basic body of the cutting tool can be fixed, at the same time as the front end of the basic body is freely available for the mounting and dismounting of the loose tops that should carry out the cutting or chip removing task in the workpieces in question. Under absolutely ideal conditions, not only the geometrical center axis of the basic body, but also the geometrical center axis of the loose top should coincide exactly with the geometrical center axis of the machine spindle, in order to generate a hole having optimum precision in respect of shape as well as position in the workpiece. However, in practice it is difficult to reach an optimum precision, above all because of inevitable tolerances in the interface between the loose top and the basic body, which, as known, are individually manufactured in different operations and from different materials, but also because of various form defects in the basic body as well as the loose top. Therefore, in reality the result will not infrequently be that the drill wobbles when entering a workpiece, i.e., the tip of the loose top is unintentionally located offset from the geometrical center axis of the machine spindle, which determines the geometrical position of the hole to be made. Instead of moving linearly into the workpiece, the tip of the loose top, therefore, initially describes a circling or planetary motion before being stabilized in a linear track of motion that may be located more or less far from the intended track of motion.

DESCRIPTION OF THE PRIOR ART

A cutting tool of the type initially mentioned is previously known from SE 0103752-2 (corresponding to U.S. Publication No. 2003/103824). However, a disadvantage of this tool is that the male part of the loose top is formed in such a way that it has to be inserted from the side into the receiving groove in the basic body. In order to obviate this disadvantage, a tool has been developed, which is the subject of SE 0400056-8, and which makes it possible to insert the male part of the loose top axially into the groove of the basic body, i.e., perpendiclarly to the axis of rotation. In this case, the male part of the loose top is formed with a rotationally-symmetrically formed centering protrusion (i.e., symmetrical about the axis of rotation), which is arranged to engage a likewise rotationally-symmetrically formed recess in the bottom surface of the groove. The purpose of the centering protrusion is to center the loose top in relation to the basic body, and for this purpose the centering protrusion has a conical envelope surface, the largest and smallest diameters of which are so adjusted, that a linear contact is established between that surface and a substantially circular edge that defines the mouth of the recess. This construction requires extremely good manufacturing precision, not only in connection with the production of the loose top made from cemented carbide, but also in connection with the production of the basic body, which consists of steel. In addition, no guarantee for the machining precision will arise, even if the loose top in fact would come to be centered exactly in relation to the basic body. Thus, even small form defects in the basic body may lead to the loose top's own axis being non-coincident with the center axis of the machine spindle.

OBJECTS AND FEATURES OF THE INVENTION

The present invention aims at obviating the above-mentioned drawbacks of previously known cutting tools and at providing an improved cutting tool. Therefore, a primary object of the invention is to provide a cutting tool in particular intended for drilling, the loose top of which can be centered in a very exact way in relation to the axis of the machine spindle. Another object of the invention is to realize an improved machining precision by means of simple and inexpensive means. It is also an object to provide a tool in which the interface between the loose top and the basic body is of such a nature that the user/operator, in connection with the mounting of the loose top, is given a reassured feeling in that the loose top is perceived as being fixed in a distinct and reliable way in the groove of the basic body.

According to the invention, at least the primary object is attained by a rotable tool for chip removing machining, comprising a body and a cutting part. The body defines a longitudinal center axis and includes a groove and a forwardly open slot. The groove is formed in an axial front end of the body and includes an axially forwardly facing bottom surface and two side surfaces. The forwardly open slot is formed in the bottom surface, wherein the slot and the groove separate a pair of leg portions of the body that are elastically movable away from and toward each other to respectively expand and contract the groove. The cutting part is replaceably mounted to the body and includes an axially rearwardly projecting male part axially clamped in the groove between the leg portions. The male part includes an end surface, and two flank surfaces. The end surface faces the bottom surface of the groove. The two flank surfaces face and engage respective ones of the side surfaces of the groove in clamping relationship. Either the end surface or the bottom surface has a seating recess formed therein which receives a projection disposed on the other of the end surface and the bottom surface. The seating recess receives the projection with play in a direction parallel to the side surfaces and the flank surfaces, to enable the cutting part to move relative to the body in said direction during a cutting operation, wherein the cutting part is self centering with the axis.

BRIEF DESCRIPTION OF THE DRAWINGS

In the drawings, preferred embodiments of the invention are depicted, wherein.

DESCRIPTION OF PREFERRED
EMBODIMENTS

Figure 1:
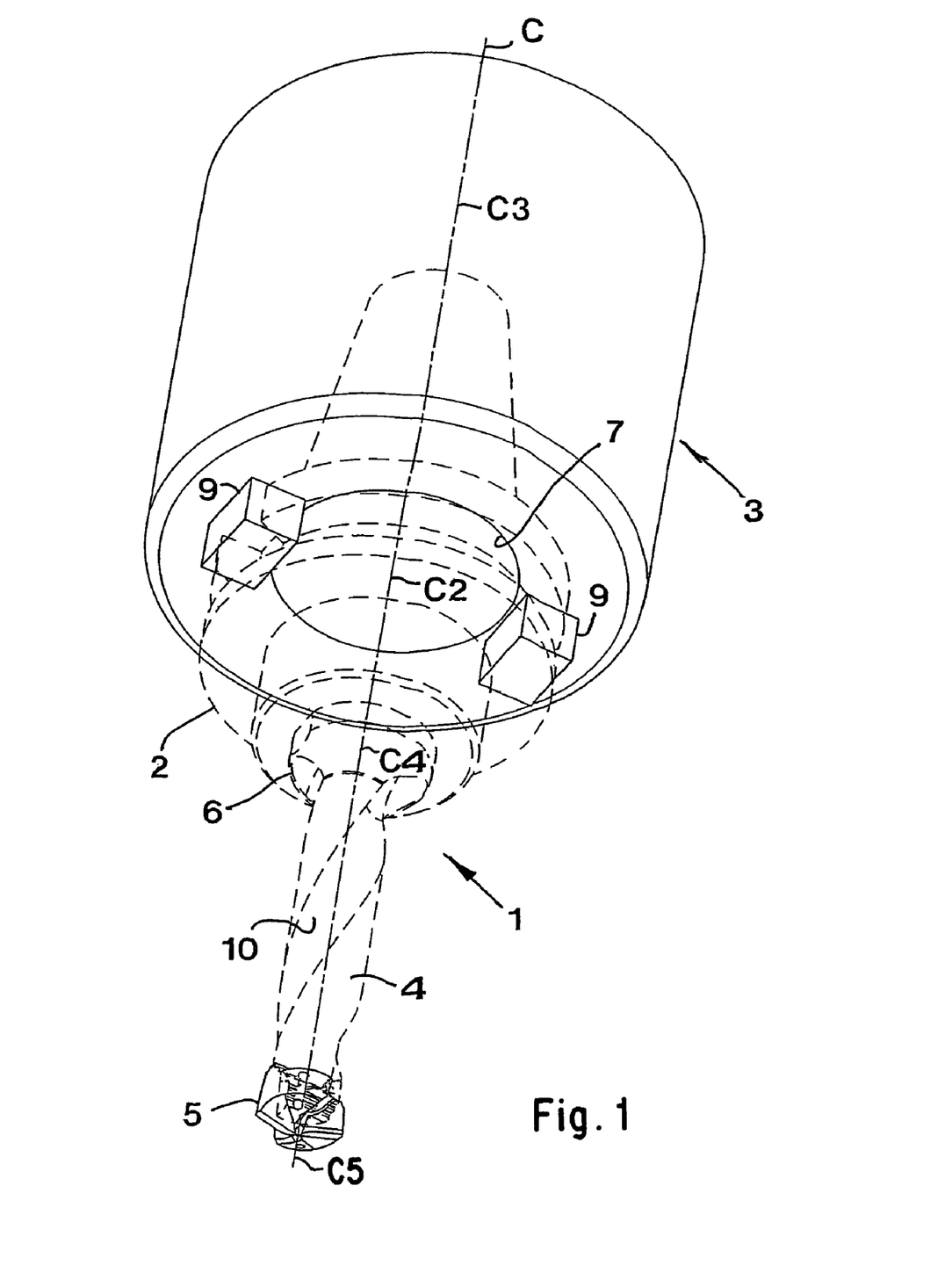
FIG. 1 is a perspective view of a cutting tool being in the form of a drill according to the invention and mounted in a rotatable machine spindle, the basic body of the tool being illustrated in phantom view.

In FIG. 1, numeral 1 generally designates a cutting tool in the form of a drill, which is shown mounted in a holder 2, which in turn is mounted in a rotatable machine spindle 3. The drill is composed of a basic body 4 illustrated in phantom view, as well as a releasable cutting part or loose top 5. In this case, the basic body 4 comprises a comparatively narrow, cylindrical shaft, which at a rear end has a thickened portion 6, which can be fixed in the holder 2. Said holder is, in turn, fixable in a hollow space 7 in the spindle 3. With the purpose of taking part in the transfer of torque to the drill, two shoulders 9 are arranged on the front surface of the spindle 3, which shoulders engage in recesses in the holder 2. In the shaft 4, helicoidal chip channels 10 are formed. As is clearly seen in FIG. 1, the loose top 5 is mounted on the free, front end of the shaft 4.

In FIG. 1, C designates an imaginary geometrical center line, which is shown in the form of a single dash-dotted line, which extends from the rear end of the spindle 3 to the front end of the loose top 5. However, in practice, each of the components 2, 3, 4 and 5 has its own geometrical center axis. Thus, the spindle 3 has a center axis, which is designated C3, while the individual center axes of the holder 2, the basic body 4 and the loose top 5 are designated C2, C4 and C5, respectively. Essential for the machining precision of the tool is that the center axis C5 of the loose top 5 is coincident with the center axis C3 of the spindle 3 during a drilling operation. Thus, the object of the invention is to guarantee that the center axis C5 of the loose top 5 coincides with the center axis C3 of the spindle 3, while it is incidental whether the center axes C2 and C4 are absolutely concentric with the axes C3 and C5. It shold be noted that an "axis" is considered herein to be endless, i.e., it does not lie only in the boundaries of its respective rotary element. Thus, two axes "coincide" with one another when they are exactly aligned with one another.

Figure 2:
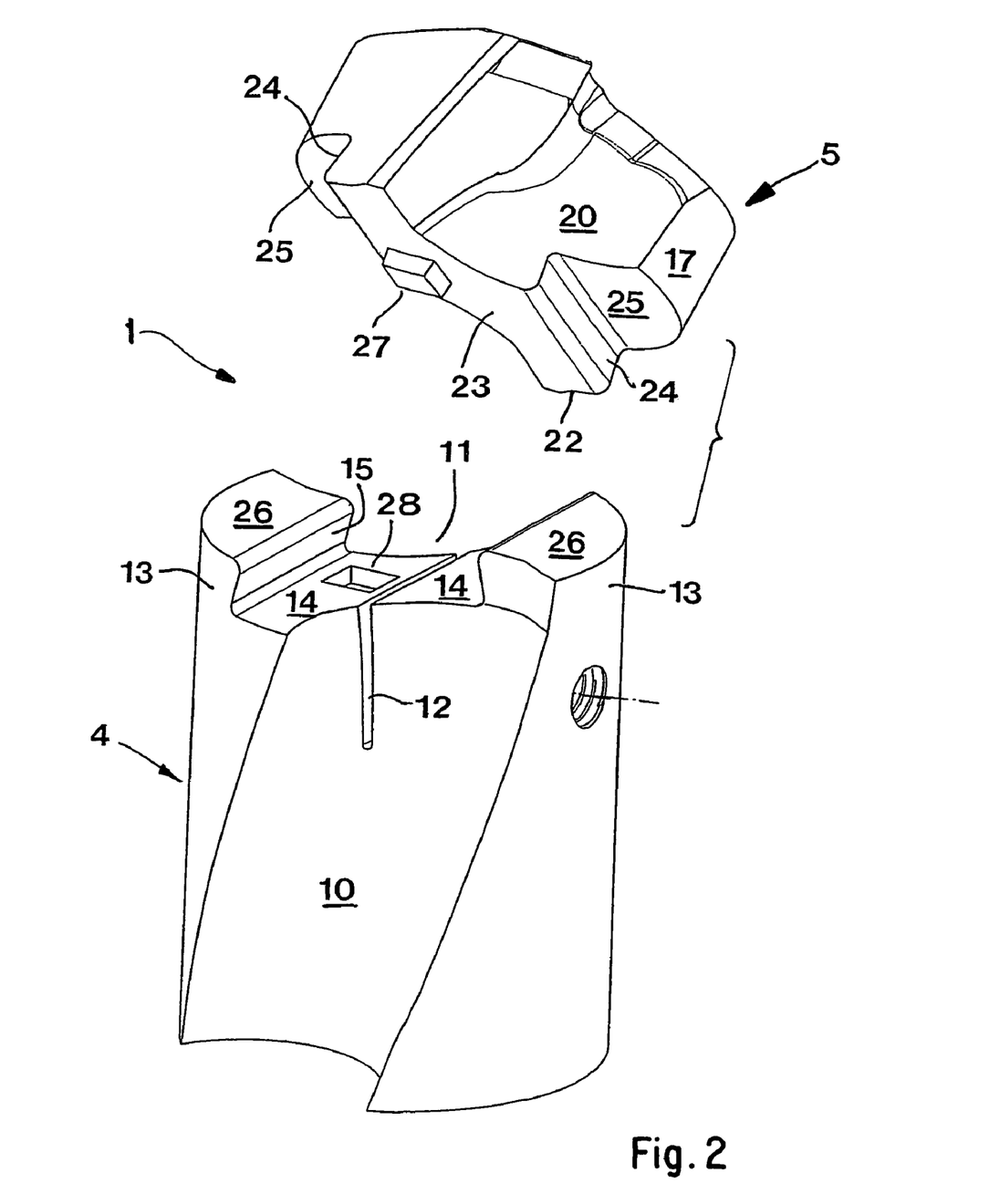
FIG. 2 is an enlarged perspective exploded view showing a part of a basic body as well as a cutting part or loose top separated from the basic body of a first embodiment of the tool according to the invention.
Figure 3:
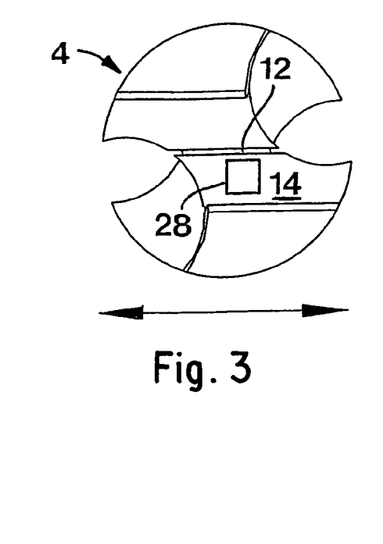
FIG. 3 is an end view of the basic body according to FIG. 2.

Reference is now made to FIG. 2, which illustrates the design of an interface between the drill or the basic body 4 and the loose top 5 in accordance with a first embodiment of the invention.

In the axial front end of the basic body 4, a groove 11 is formed, in the bottom surfcae 14 of which a slot 12 mouths. The slot, together with the groove 11, separates two elastically deflectable legs 13 from one another. The groove 11 is delimited by the bottom surface 14 and two side surfaces 15, the latter defining a jaw, the shape of which tapers (narrows) in a wedge-shaped way in the forward direction (upward in the drawing). In one of the legs 13, there is a hole 16 for a tightening screw (not shown) that can abut the other leg, by means of which the two legs can be elastically distanced somewhat from each other by deflection in order to widen the groove and enable an axial insertion of the loose top 5 into the groove 16.

Figure 4:
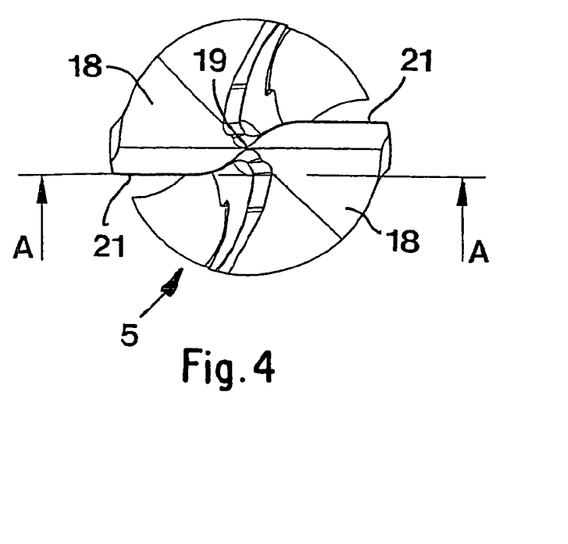
FIG. 4 is an end view of the loose top according to FIG. 2.
Figure 5:
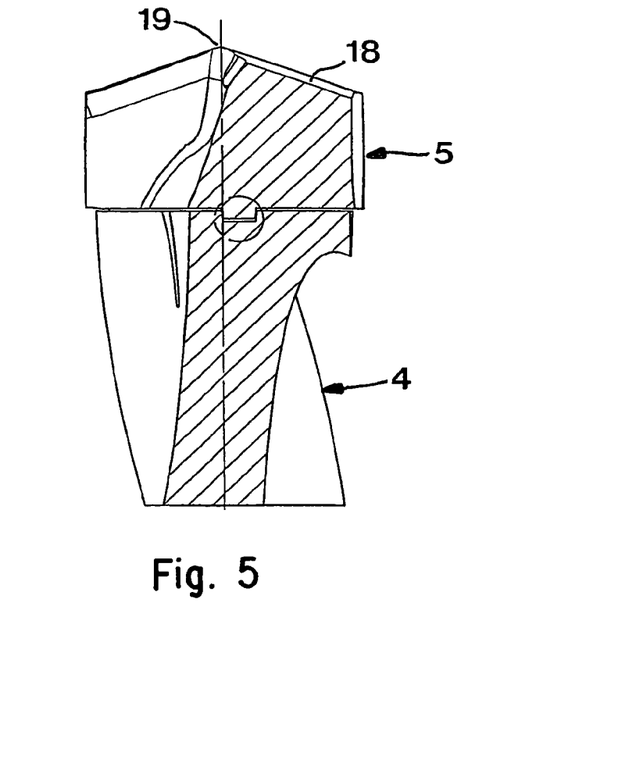
FIG. 5 is a longitudinal section A—A through the tool in assembled state.

The loose top 5 has a rotationally symmetrical basic shape in that it has a circular outer contour shape adjacent to a cylindrical or rearwardly slightly conical envelope surface 17. The front surface 18 (see also FIGS. 4 and 5) on the loose top is conical and ends in a central tip 19. Generally, the loose top has an outer diameter, which is somewhat larger than the diameter of the basic body 4. In the envelope surface 17 on the loose top, two concavely curved limiting surfaces 20 are formed, which connect to the surfaces 10 and define chip channels in the loose top. In the front part of the loose top, cutting edges 21 are formed adjacent to the chip channels 20, which edges are diametrically opposed each other, i.e., equidistantly spaced-apart by 180°. In other words, the loose top has a symmetrical basic geometry. At the rear or inner end thereof, the loose top has an axially rearwardly extending male part 22 for engagement with the groove 11. Said male part is delimited by a rearwardly facing end surface 23 and two flank surfaces 24, which are inclined in order to correspond to the wedge-shape of the groove defined by the inclined side surfaces 15. On both sides of the male part 22, there are planar, axial facing force-transmitting surfaces 25 for co-operation with uniform surfaces 26 located on both sides of the groove 11.

On the rear end surface 23 of the male part 22, a projection 27 is formed intended to engage a seating, or recess, 28 in the bottom surface 14 of the groove 11.

The loose top 5 is made entirely or partly from cemented carbide or other wear-resistant material, while the basic body 4 is made from a material having considerably greater elasticity, e.g., steel. Steel is preferred by virtue of the inherent elasticity or flexibility thereof, which makes it possible to resiliently deflect the legs 13 that are spaced-apart by the slot 12.

As far as the shown tool has been described hitherto, the same is in all essentials previously known. Characteristic of previously known tools is that the projection 27 has had the purpose of centring the loose top in an immovable state in relation to the basic body, more precisely by having such a shape, that the projection, upon insertion in the seating 28, gets in close (snug) contact with the seating.

Characteristic of the tool according to the present invention is that a dimension of the seating 28 in a direction parallel to the surfaces 15, 24 is larger than a corresonding dimension of the projection 27, in order to enable the male part 22 of the loose top 5 to move reciprocatingly (with "play") in the groove 11 during a cutting operation and thereby allow self-centring of the loose top with reference to the axis C. More precisely, due to such "play" the loose top 5, despite being frictionally clamped by the legs 13, is allowed to slide and assume a centered position, in which the center axis C5 thereof coincides with the center axis C of the spindle 3, without the center axis C4 of the basic body 4 necessarily coinciding with the axis C3.

Figure 6:
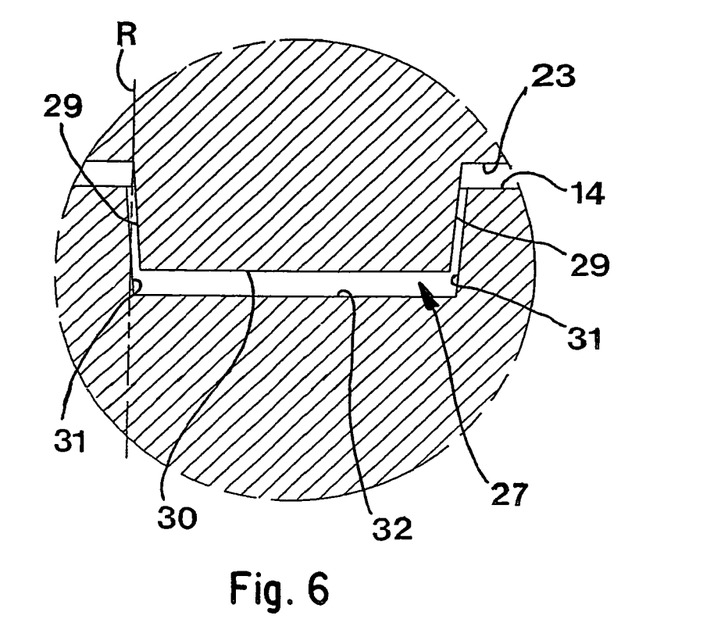
FIG. 6 is an extremely enlarged section through a part of the interface between the loose top and the basic body, more precisely in the area of a projection received in a seating, the projection being shown centered in relation to the seating.
Figure 7:
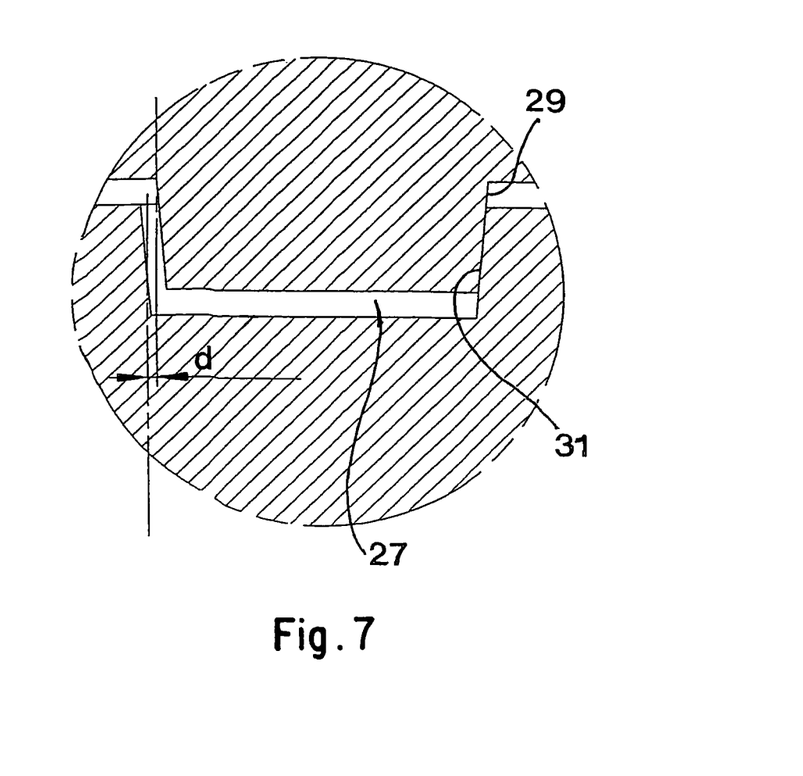
FIG. 7 is a section corresponding to FIG. 6 and showing the projection in a laterally displaced position in the seating.

In the embodiment example according to FIGS. 2–7, the projection 27 and the seating 28 have a quadrangular basic shape. Thus, the projection 27 is defined by four planar flank surfaces 29, as well as a lower end surface 30, which suitably is planar. As is clearly seen in FIGS. 6 and 7, the flank surfaces 29 are inclined in relation to the end surface 23 of the male part, more precisely in the direction inward toward each other so that the projection generally tapers in a direction away from the surface 23. The seating 28 may advantageously have generally the same shape as the projection, in that the same is delimited by four planar and inclined side surfaces 31 and a planar bottom surface 32. However, in general the seating is larger than the projection. In this connection, it should be pointed out that surface contact between the loose top 5 and the basic body 4 is established solely between the end surfaces 25, 26 and between the side surfaces 15 of the groove and the flank surfaces 24 of the male part, respectively. This means that the end surface 23 of the male part is distanced from the bottom surface of the groove 14, such as clearly is seen in FIGS. 6 and 7. Furthermore, the height of the projection 27 is so adapted in relation to the depth of the seating 28, that the surfaces 30 and 32 do not contact each other. In other words, the projection does not bottom-out in the seating.

In FIG. 6, the projection 27 is shown in a neutral intermediate position in the seating 28, i.e., the two flank surfaces 29 on the projection are distanced from the corresponding side surfaces 31 in the seating. From this neutral position, which is defined by a reference line R, the projection 27 is movable reciprocatingly in the plane that is defined by the groove 11, i.e., parallel to the side surfaces 15 of the groove. However, the projection cannot move perpendicularly to said plane, because the deflectable legs 13 are kept pressed against the flank surfaces 24 of the male part 22 and guide the male part linearly. In this connection, it should be emphasized that the mobility of the projection 27 in the groove 11 does not mean that the projection is freely movable. On the contrary, the deflectable legs 13 guarantee a prestress of the projection in the arbitrary position that the projection and the loose top assume in connection with the mounting. Therefore, lateral displacement of the loose top takes place first when the loose top has entered a workpiece and is subjected to considerable cutting forces which can overcome the clamping forces. In other words, the legs clamp the projection in any given position as long as the drill rotates without having entered the workpiece.

In FIG. 7, the projection 27—after having been subjected to cutting forces—is shown displaced rightwards to an end position, in which the right flank surface 29 abuts against the right side surface 31 of the seating. The distance d, with which the projection is moved from the position according to FIG. 6 to the position according to FIG. 7, constitutes a measure of the size difference between the seating and the projection. In other words, the measure d can be regarded to define the radial mobility of the loose top (the mobility diametrically=2d).

The difference between the width of the seating 28 and the width of the projection as seen in the longitudinal extension of the groove varies in practice depending on the diameters of the drills, more precisely in such a way that the difference is small in drills of small diameters and larger in drills of larger diameters. However, in all events, the difference between the width of the seating and the width of the projection (i.e., the "play") should amount to at least 0.02 mm (d=0.01 mm) and at most 0.20 mm (d=0.10 mm). In practice, the difference between the width of the seating and the width of the projection may advantageously fall within the range of 0.04–0.16 mm, suitably 0.07–0.13 mm.

By the fact that the loose top is radially movable within the limits determined by the measure 2d, a self-centring of the same is enabled in connection with the entering of the drill into a workpiece. Thus, if the center axis C4 of the basic body 4 in the area of the interface against the loose top, for one reason or the other, e.g., tolerances in the interface and/or minor shape defects in the basic body and/or the holder 2, does not coincide with the center axis C3 of the spindle 3, then the loose top will be displaced to the center axis C3. This occurs when the loose top has entered the workpiece and is subjected to cutting forces that are considerably greater than the prestressing (clamping) force exerted by the legs 13 against the male part 22 of the loose top.

In the tool according to FIGS. 2–7, the seating 28 is entirely located to the half of the bottom surface 14 that is situated on one side of the slot 12, in addition to which the projection 27 is laterally displaced correspondingly.

Figure 8:
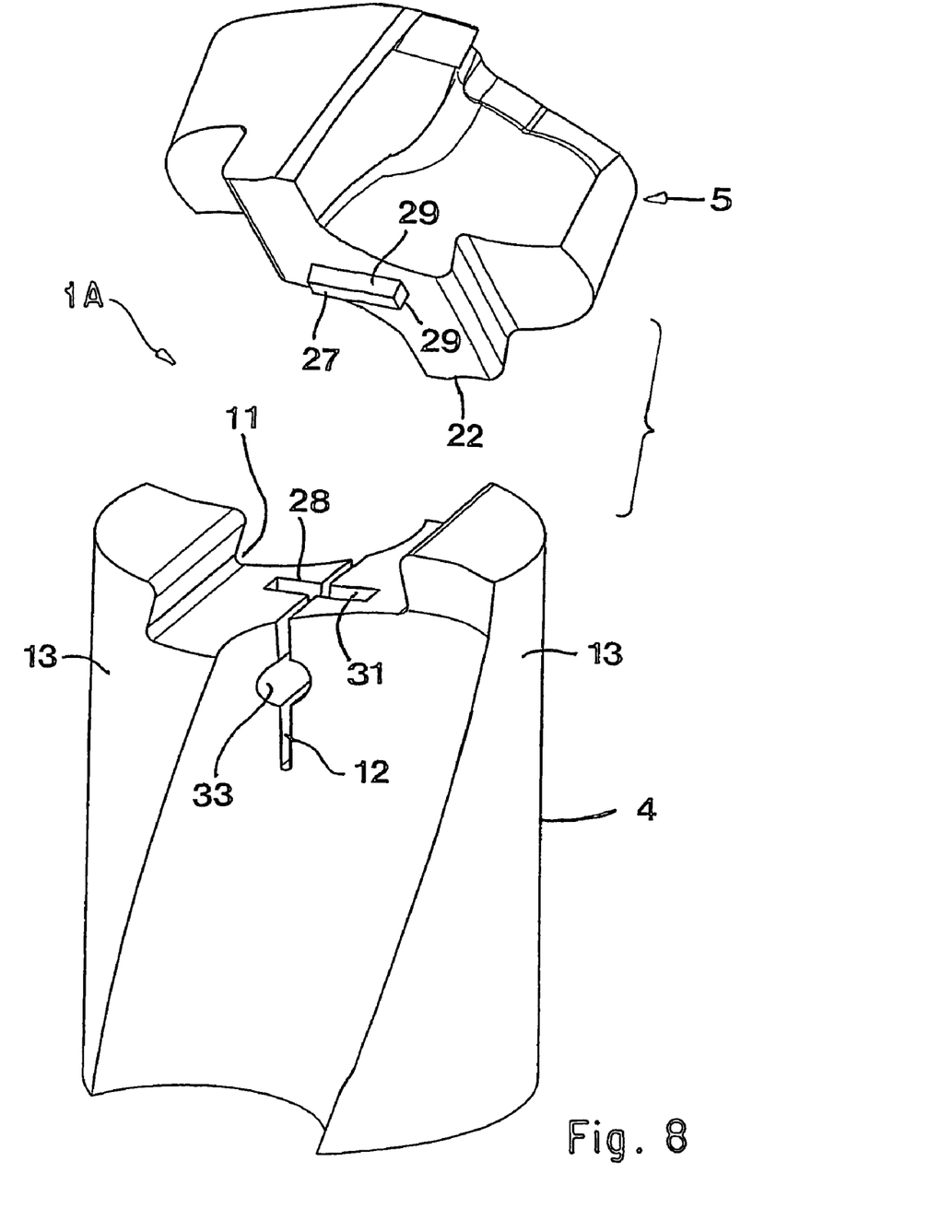
FIG. 8 is an exploded view corresponding to FIG. 2 and showing a second, alternative embodiment of the tool according to the invention.

Reference is now made to FIG. 8, which illustrates an alternative embodiment of a drill 1A, in which an elongate seating 28 bridges over the slot 12. More precisely, in this case the seating is made by two uniform recess portions, which are axially forwardly open and mouth in the slot 12. The projection 27 of the loose top 5 has the same elongate basic shape as the seating 28, although the width of the projection measured between the side surfaces 29 is smaller than the width of the seating measured between the side surfaces 31. By the fact that the elongate projection together with the seating are oriented perpendicularly to the radial direction of motion of the loose top 5, the contact surfaces 29, 31 that form stops in the two outer positions of the loose top are enlarged.

Another difference between the previously described embodiment and the embodiment according to FIG. 8, is that the latter lacks a tightening screw for the deflection of the legs 13. Instead, a cross-section-wise oval key recess 33 is formed adjacent to the slot 12 for a likewise cross-section-wise oval key, by means of which the legs can be bent apart.

Figure 9:
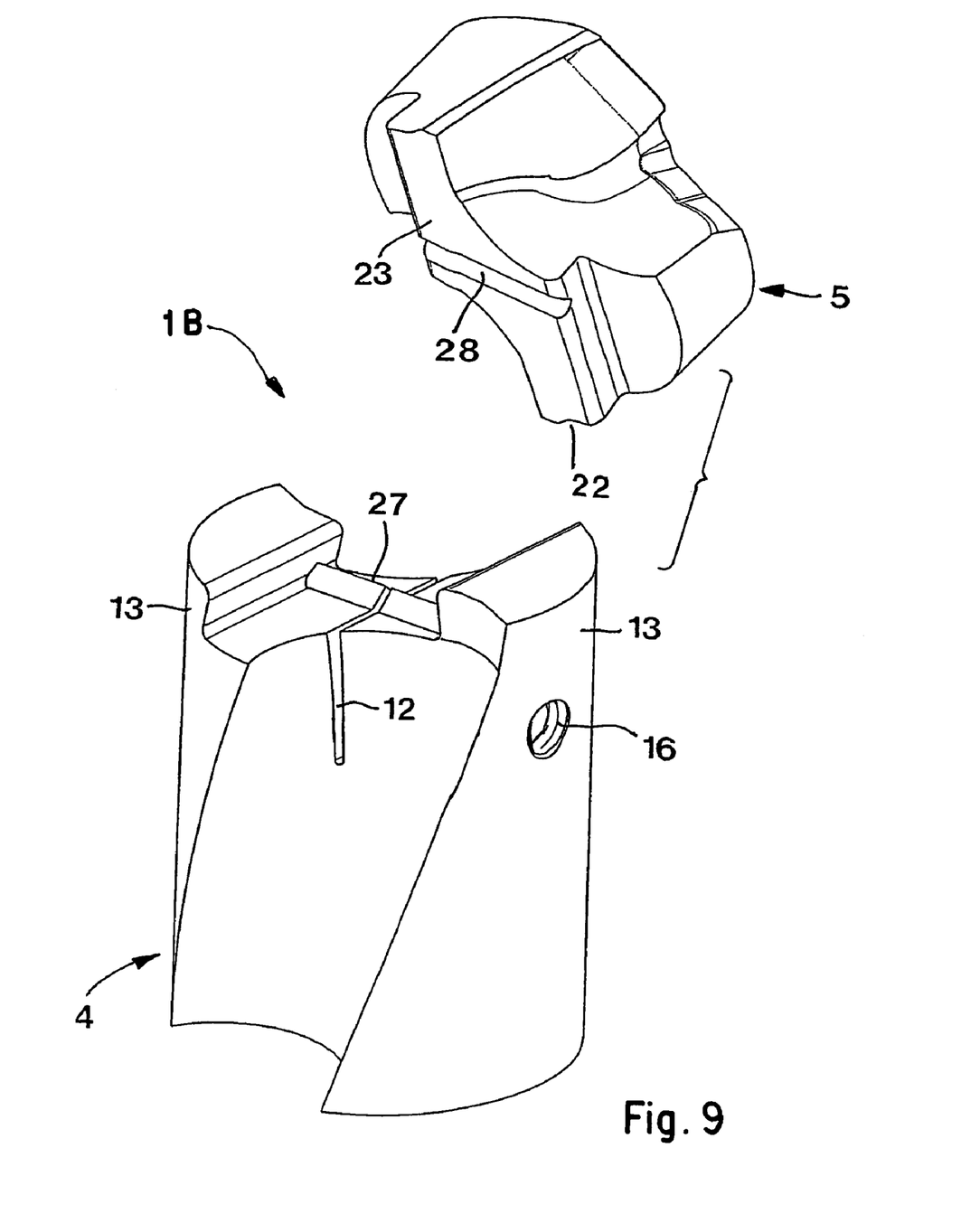
FIG. 9 is an exploded view showing a third, alternative embodiment of the invention.

In FIG. 9, an additional alternative embodiment of the drill 1B is shown. In this case, a seating 28 is formed in the male part 22 of the loose top 5. More precisely, the seating 28 is in the shape of an elongate, cross-section-wise V-shaped groove, which is countersunk in the surface 23 and extends along the entire width of the male part. A projection 27 is in turn formed in the groove of the basic body 4. More precisely, the projection is of the shape of a cross-section-wise V-shaped bulge or ridge, which projects from the bottom surface of the groove 14. Advantageously, the ridge extends along the entire width of the groove, although it is bisected by the slot 12. In the above described way, the width of the groove 28 is larger than the width of the ridge 27, in order to enable reciprocating displacement of the male part 22 a short distance in the groove.

Figure 10:
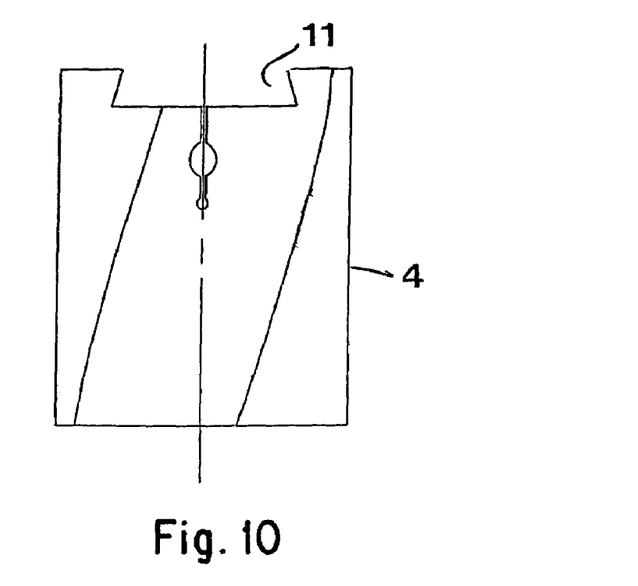
FIG. 10 is a side view of a basic body.
Figure 11:
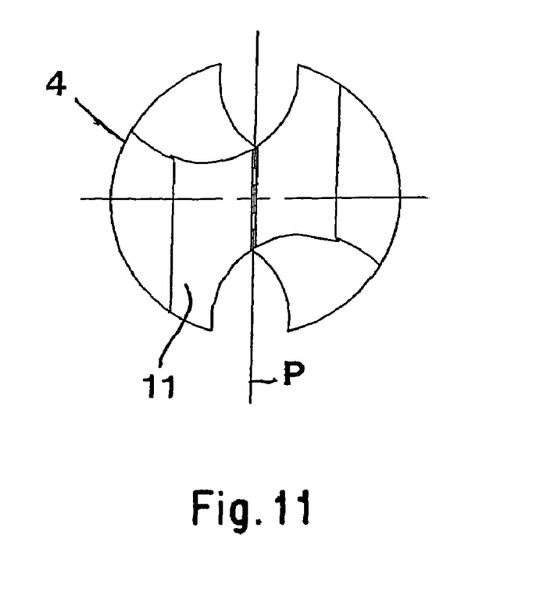
FIG. 11 is an end view of the basic body of FIG. 10.
Figure 12:
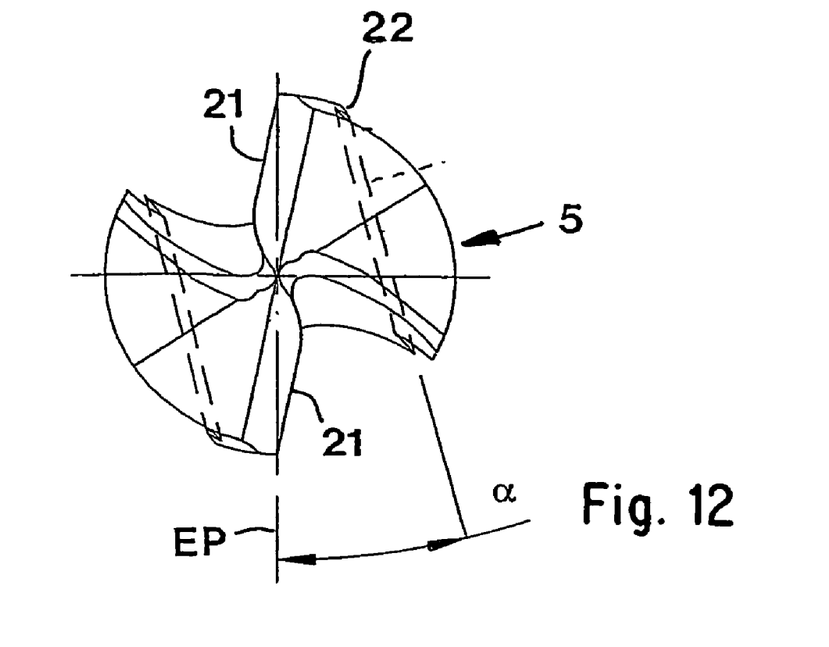
FIG. 12 is an end view of a loose top co-operating with the basic body according to FIGS. 10 and 11.

Reference is now made to FIGS. 10–12, which illustrate that the groove 11 in the basic body 4 is oriented in a plane P. In FIG. 12, a symmetrical loose top is shown, the two equidistantly separated, i.e., diametrically opposed cutting edges 21 of which are intersected by a radial plane designated EP. It would be ideal to orientate the flank surfaces 24 of the male part 22 of the loose top parallel to the plane EP, but for reasons of geometry/construction, this is difficult or impossible (depending on the formation of the chip channels 10, 20). Therefore, the male part usually has to be sloped such that the flank surfaces 24 thereof are oriented at a certain angle a to the radial plane EP. This angle a, which in the example according to FIG. 12 amounts to about 15°, should be as small as possible, and in all events not exceed 30°. Suitably, the angle a should be smaller than 20 to 25°.

Figure 13:
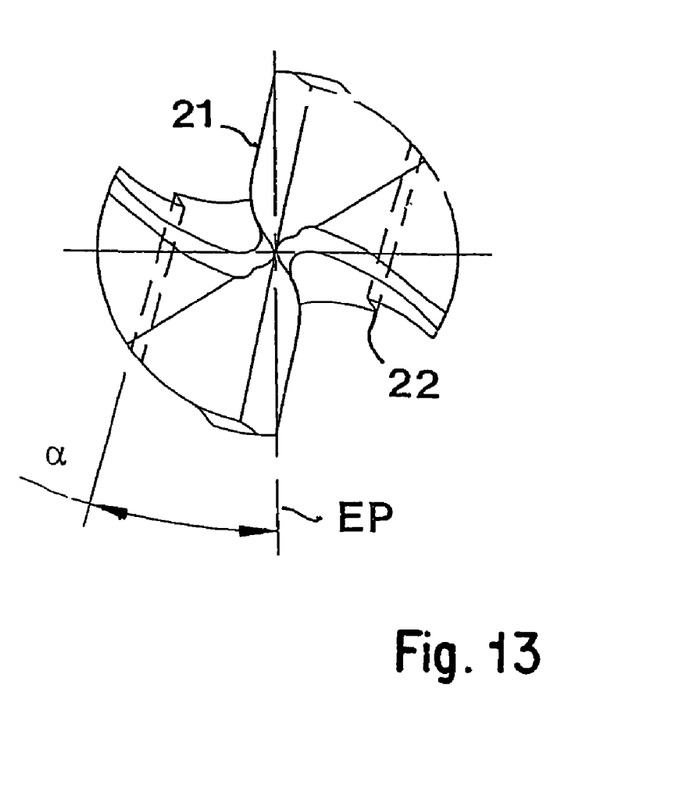
FIG. 13 is an end view of another embodiment of a loose top.

FIG. 13 illustrates another embodiment of a loose top. In this case, the male part 22 is rotated clockwise in relation to the male part according to FIG. 12. Also in this case, the angle a should not exceed 30°.

FEASIBLE MODIFICATIONS OF THE INVENTION

The invention is not solely limited to the embodiments described above and illustrated in the drawings. Thus, the geometrical shape of the projection as well as the appurtenant seating may be varied in miscellaneous ways within the scope of the subsequent claims. For instance, the projection and the seating, respectively, may be of a rotationally symmetrical basic shape, such as cylindrical or slightly conical basic shape.

What is claimed is:

1. A rotatable tool for chip removing machining comprising:
   a body defining a longitudinal center axis and including:
      a groove formed in an axial front end of the body, the groove including an axially forwardly facing bottom surface and two side surfaces, and
      a forwardly open slot formed in the bottom surface, wherein the slot and the groove separate a pair of leg portions of the body that are elastically movable away from and toward each other to respectively expand and contract the groove, and
   a cutting part replaceably mounted to the body and including an axially rearwardly projecting male part axially clamped in the groove between the leg portions, the male part including:
   an end surface facing the bottom surface of the groove, and
      two flank surfaces facing and engaging respective ones of the side surfaces of the groove in clamping relationship therewith;
   one of the end surface and the bottom surface having a seating recess formed therein and receiving a projection disposed on the other of the end surface and the bottom surface, wherein the seating recess receives the projection with play in a direction parallel to the side surfaces and the flank surfaces to enable the cutting part to move relative to the body in said direction during a cutting operation, wherein the cutting part is self-centering with respect to said axis.

2. The tool according to claim 1 wherein the play is at least 0.02 mm.

3. The tool according to claim 2 wherein the play is no greater than 0.20 mm.

4. The tool according to claim 1 wherein the play is no greater than 0.20 mm.

5. The tool according to claim 1 wherein an axial front end of the cutting part includes a center tip and a plurality of cutting edges extending generally radially therefrom, the cutting edges being equidistantly spaced from one another.

6. The tool according to claim 1 wherein the projection extends from the bottom surface, and the seating recess is formed in the end surface.

7. The tool according to claim 1 wherein the seating recess is formed in the bottom surface, and the projection extends from the end surface.

8. The tool according to claim 6 wherein the entire seating recess is spaced from the slot.

9. The tool according to claim 6 wherein the seating recess intersects the slot, wherein the seating recess includes recess portions disposed on respective sides of the slot.

10. The tool according to claim 1 wherein the seating recess and the projection are of elongated configuration in a direction perpendicular to the side surfaces and the flank surfaces.

11. The tool according to claim 1 wherein one of the leg portions includes a threaded hole for receiving a screw that abuts the other leg portion, to elastically displace the leg portions away from one another when the screw is tightened.

* * * * *